(12) United States Patent
Salthouse et al.

(10) Patent No.: US 9,187,171 B2
(45) Date of Patent: Nov. 17, 2015

(54) LINKAGE FOR GUIDING A FLEXIBLE CABLE

(75) Inventors: Mark Anthony Salthouse, Bristol (GB); Christopher Biggadike, Cheltenham (GB); Graeme John Dutton, Acerington (GB)

(73) Assignee: ULTRA ELECTRONICS LIMITED, Greenford, Middlesex (GB)

( * ) Notice: Subject to any disclaimer, the term of this patent is extended or adjusted under 35 U.S.C. 154(b) by 299 days.

(21) Appl. No.: 13/808,368

(22) PCT Filed: Jul. 5, 2011

(86) PCT No.: PCT/GB2011/051265
§ 371 (c)(1),
(2), (4) Date: May 22, 2013

(87) PCT Pub. No.: WO2012/004594
PCT Pub. Date: Jan. 12, 2012

(65) Prior Publication Data
US 2013/0233967 A1 Sep. 12, 2013

(30) Foreign Application Priority Data
Jul. 6, 2010 (GB) .................................. 1011378.5

(51) Int. Cl.
*B64C 9/22* (2006.01)
*B64C 13/30* (2006.01)
*F16C 7/02* (2006.01)

(52) U.S. Cl.
CPC . *B64C 13/30* (2013.01); *B64C 9/22* (2013.01); *F16C 7/02* (2013.01); *Y10T 74/2142* (2015.01)

(58) Field of Classification Search
CPC .............. B64C 9/02; B64C 9/06; B64C 9/22; B64C 1/26; B64C 3/38
See application file for complete search history.

(56) References Cited

U.S. PATENT DOCUMENTS

| 522,009 | A | | 6/1894 | Gual |
| 2,246,116 | A | * | 6/1941 | Wagner et al. ................ 244/216 |
| 2,973,925 | A | | 3/1961 | Wiele |
| 4,437,631 | A | * | 3/1984 | Martens et al. ............... 244/214 |
| 7,249,375 | B2 | | 7/2007 | Bhatia et al. |
| 7,249,735 | B2 | * | 7/2007 | Amorosi et al. ............. 244/99.2 |
| 2006/0038088 | A1 | * | 2/2006 | Dodson ......................... 244/214 |
| 2006/0261228 | A1 | * | 11/2006 | Hung .......................... 248/282.1 |

FOREIGN PATENT DOCUMENTS

| FR | 2 547 270 | 12/1984 |
| GB | 2 073 681 | 10/1981 |

(Continued)

OTHER PUBLICATIONS

International Search Report and Written Opinion for International Application No. PCT/GB2011/051265 mailed Oct. 6, 2011.

(Continued)

*Primary Examiner* — Justin Benedik
(74) *Attorney, Agent, or Firm* — Merchant & Gould P.C.

(57) ABSTRACT

A linkage guides a flexible cable between two structures. The linkage includes a proximal arm with a proximal pivot joint for coupling the proximal arm to a first one of the two structures; and a distal arm which is coupled to the proximal arm by one or more intermediate pivot joints. The distal arm is shaped to follow a three-dimensional curve along a majority of its length. Shaping the distal arm to form a three-dimensional curve along a majority of its length enables the distal arm to pass through a relatively small aperture as the linkage is adjusted between its retracted and extended positions. It also enables the proximal arm to move in a locus of movement which does not interfere with other system components. The linkage can be used to guide a flexible cable between any two structures, for instance a fixed aircraft wing and a slat.

15 Claims, 10 Drawing Sheets

(56) References Cited

FOREIGN PATENT DOCUMENTS

| GB | 2073681 A | * | 10/1981 | |
|---|---|---|---|---|
| GB | 2 390 800 | | 1/2004 | |
| GB | 2390800 A | * | 1/2004 | ............. F16M 13/02 |

OTHER PUBLICATIONS

United Kingdom Search Report from GB1011378.5 mailed Sep. 30, 2010.

* cited by examiner

LINKAGE FOR GUIDING A FLEXIBLE CABLE

This application is a National Stage Application of PCT/GB2011/051265, filed 5 Jul. 2011, which claims benefit of Serial No. 1011378.5, filed 6 Jul. 2010 in Great Britain and which applications are incorporated herein by reference. To the extent appropriate, a claim of priority is made to each of the above disclosed applications.

FIELD OF THE INVENTION

The present invention relates to a linkage for guiding and protecting a flexible cable between first and second structures, the second structure being movable relative to the first structure. The linkage comprises a proximal arm with a proximal pivot joint for coupling the proximal arm to a first one of the two structures; and a distal arm which is coupled to the proximal arm by one or more intermediate pivot joints.

BACKGROUND OF THE INVENTION

US 2006/0038088 discloses an aircraft wing comprising a fixed wing and a slat movable relative to the fixed wing between a retracted position and an extended position. An electrical cable extends between the fixed wing and an electrical system on the slat, and a linkage guides the electrical cable between the two structures. The linkage is adjustable between a retracted position when the slat is in its retracted position and an extended position when the slat is in its extended position. The linkage comprises three links which are connected together by two pivot joints. The linkage is coupled to the fixed wing by a rotary joint and to the slat by a gimbal joint. The links have generally straight profiles, although curved or angled links can be used if necessary and/or appropriate.

As the linkage extends, it rotates down about the rotary joint. As a result a large aperture must be provided in the leading edge skin of the fixed wing to accommodate the movement of the linkage. Such a large aperture results in a number of problems. Firstly, the aperture will admit air into the interior of the leading edge and thus create undesirable aerodynamic effects. Secondly, the aperture will admit foreign objects into the interior of the leading edge which may damage structure such as the spar, hydraulic cables or electrical cables. Thirdly the aperture will weaken the leading edge skin of the fixed wing. This is a particular problem if the skin is formed from composite material.

A further problem with the downward rotation of the linkage about the rotary joint is that the linkage will tend to interfere with hydraulic or electrical cables (or other system components) running in a spanwise sense along the wing.

SUMMARY OF THE INVENTION

A first aspect of the invention provides a linkage for guiding and protecting a flexible cable between first and second structures, the second structure being movable relative to the first structure. The linkage comprises a proximal arm; a proximal pivot joint for coupling the proximal arm to the first structure; and a distal arm which is coupled to the proximal arm by one or more intermediate pivot joints. The distal arm is shaped as a three-dimensional curve along a majority of its length.

Shaping the distal arm as a three-dimensional curve along a majority of its length enables the distal arm to pass through a relatively small aperture as the linkage is adjusted between its retracted and extended positions. It also enables the proximal arm to occupy a swept volume as it moves which does not interfere with other system components.

The linkage can be used to guide and protect a flexible cable between any two structures. For instance the cable may provide electrical power to a wing-ice protection system on an aircraft slat, to a leading edge failure detection device on an aircraft slat, or to a device on a trailing edge aircraft flap. Alternatively the cable may be part of a harness on an aircraft landing gear. Alternatively the cable may provide electrical power to a component on a door.

The cable may be an electrical cable, a hydraulic or pneumatic cable for carrying hydraulic or pneumatic fluid, or any other flexible line.

Typically the proximal pivot joint only permits the proximal arm to rotate relative to the first one of the structures about a single axis of rotation.

Preferably the intermediate pivot joint (or joints) permit the distal arm to rotate relative to the proximal arm about two or more axes of rotation. For instance the intermediate pivot joint may comprise a series of single-axis pivot joints, or a ball joint. Preferably the intermediate pivot joint (or joints) permit the distal arm to rotate relative to the proximal arm about three more axes of rotation, and most preferably it comprises a ball joint which permits the distal arm to rotate relative to the proximal arm about three axes of rotation.

Typically the linkage further comprises a distal pivot joint for coupling the distal arm to a second one of the two structures. Preferably the distal pivot joint permits the distal arm to rotate relative to the second one of the structures about at least two axes of rotation. The distal pivot joint may comprise a pair of single-axis joints which are connected together by a connector. Preferably the distal pivot joint permits the distal arm to rotate relative to the second one of the structures about no more than two axes of rotation since this enables the movement of the linkage to be statically deterministic.

Typically the distal arm is tubular. The tubular shape enables the flexible cable to be guided within the interior of the tube and protects the flexible cable from electromagnetic interference.

Typically the distal arm has a centre line which is shaped as a three-dimensional curve along a majority of its length.

Typically the linkage further comprises a helical channel for guiding the flexible cable in one or more coils. Preferably the axis of the helical channel is substantially coaxial with the pivot joint which couples the proximal arm to the distal arm.

Typically the distal arm has an outer periphery which is substantially circular or oval in cross-section. A circular or oval cross-section is preferred because it provides a smooth surface to seal against other structure. It also provides a low drag aerodynamic profile.

A second aspect of the invention provides an aircraft wing comprising: a fixed wing having a skin; a control surface movable relative to the fixed wing between a retracted position and an extended position; a flexible cable extending between the fixed wing and the control surface; and a linkage according to the first aspect of the invention guiding and protecting the flexible cable and movable between a retracted position when the control surface is in its retracted position and an extended position when the control surface is in its extended position, wherein the linkage comprises a proximal arm which is coupled to the fixed wing by a proximal pivot joint; and a distal arm which is coupled to the proximal arm by one or more intermediate pivot joints and to the control surface by a distal pivot joint, wherein the distal arm of the linkage passes through an aperture in the skin of the fixed wing and is shaped as a three-dimensional curve.

The control surface may be a slat on the leading edge of the wing, a flap on the trailed edge of the wing, or any other movable control surface.

The distal arm may engage the skin of the fixed wing as it passes through the aperture, typically via a flexible resilient sealing member such as a brush or rubber seal.

A further aspect of the invention provides a method of deploying the control surface of the aircraft wing of the second aspect of the invention, the method comprising: moving the control surface relative to the fixed wing between a retracted position and an extended position; and moving the linkage between a retracted position when the control surface is in its retracted position and an extended position when the slat is in its extended position, wherein at each position of movement of the control surface a part of the distal arm cross-section passes through the same point of the aperture.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
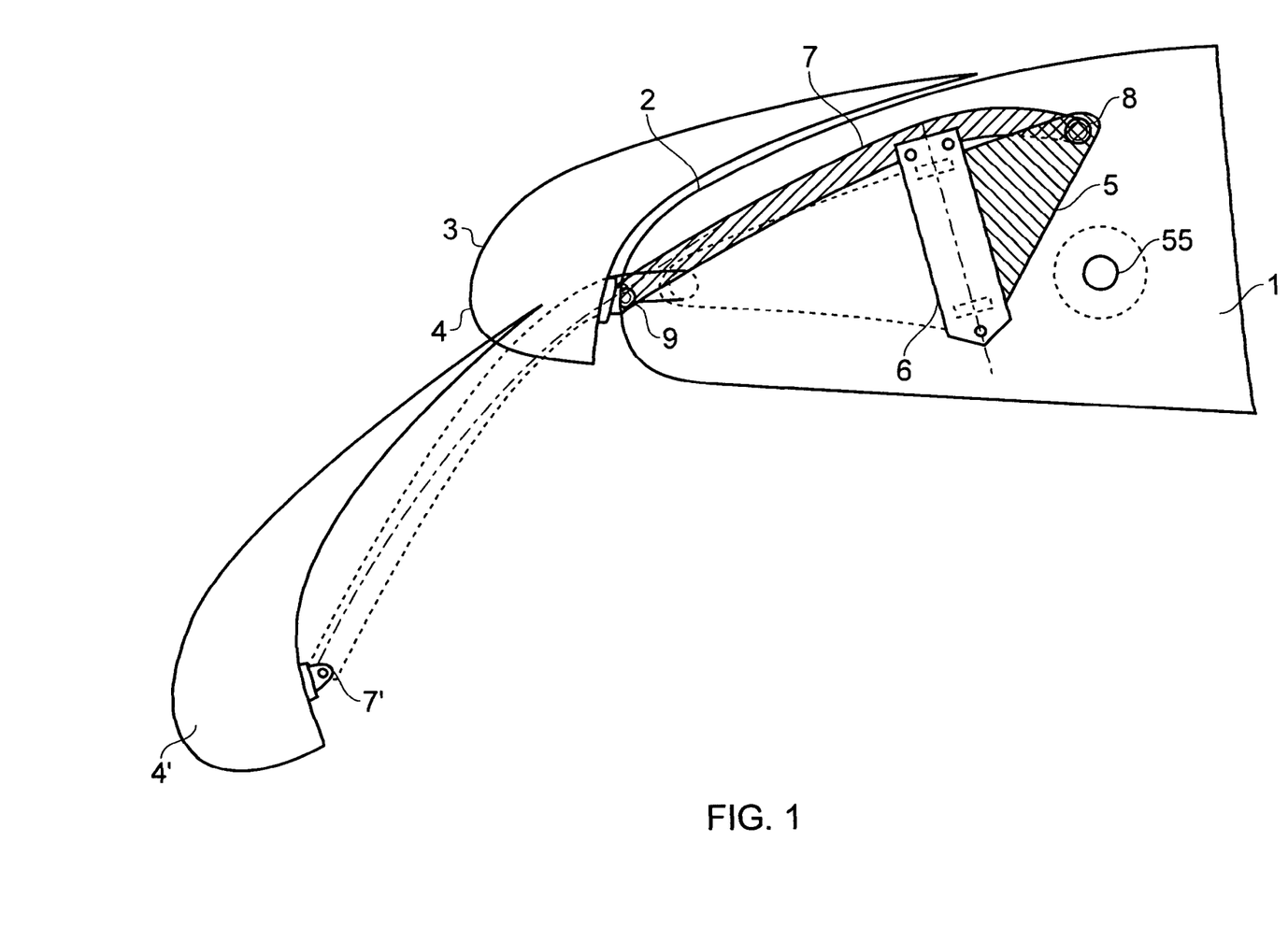
FIG. 1 is a schematic view of the leading edge of an aircraft wing, viewed in cross-section.

FIG. 1 is a schematic view of the leading edge of an aircraft wing, viewed in cross-section. The wing comprises a fixed wing part 1 with a D-nose fixed leading edge skin 2; and a slat 4 movable relative to the fixed wing between a retracted upper position, and an extended lowered position (labelled 4',7'). The slat 4 is driven between its two positions by a draft shaft 55 and an actuation mechanism which is not shown. Typically the actuation mechanism comprises a slat track which extends to the rear of the slat and is driven along a curved path by a set of driven rollers.

The slat 3 carries a de-icing system (not shown) which heats the leading edge 4 of the slat 3 to prevent the build up of ice. A flexible cable (not shown in FIG. 1) extends between the fixed wing and the slat in order to carry electrical power to the de-icing system.

A linkage system guides the flexible cable and is adjustable between a retracted position (shown in solid line) when the slat is in its retracted position and an extended position (shown in dashed line) when the slat is in its extended position. The linkage comprises a proximal arm 5 which is coupled to the fixed wing by a proximal pivot joint 6; and a distal arm 7 which is coupled to the proximal arm 5 by an intermediate ball-joint 8 and to the slat 3 by a distal pivot joint 9. The linkage system 5-9 is passive, in that it does not drive the slat 4 between its two positions, rather it is pulled and pushed by the actuation mechanism (not shown).

Figure 2:
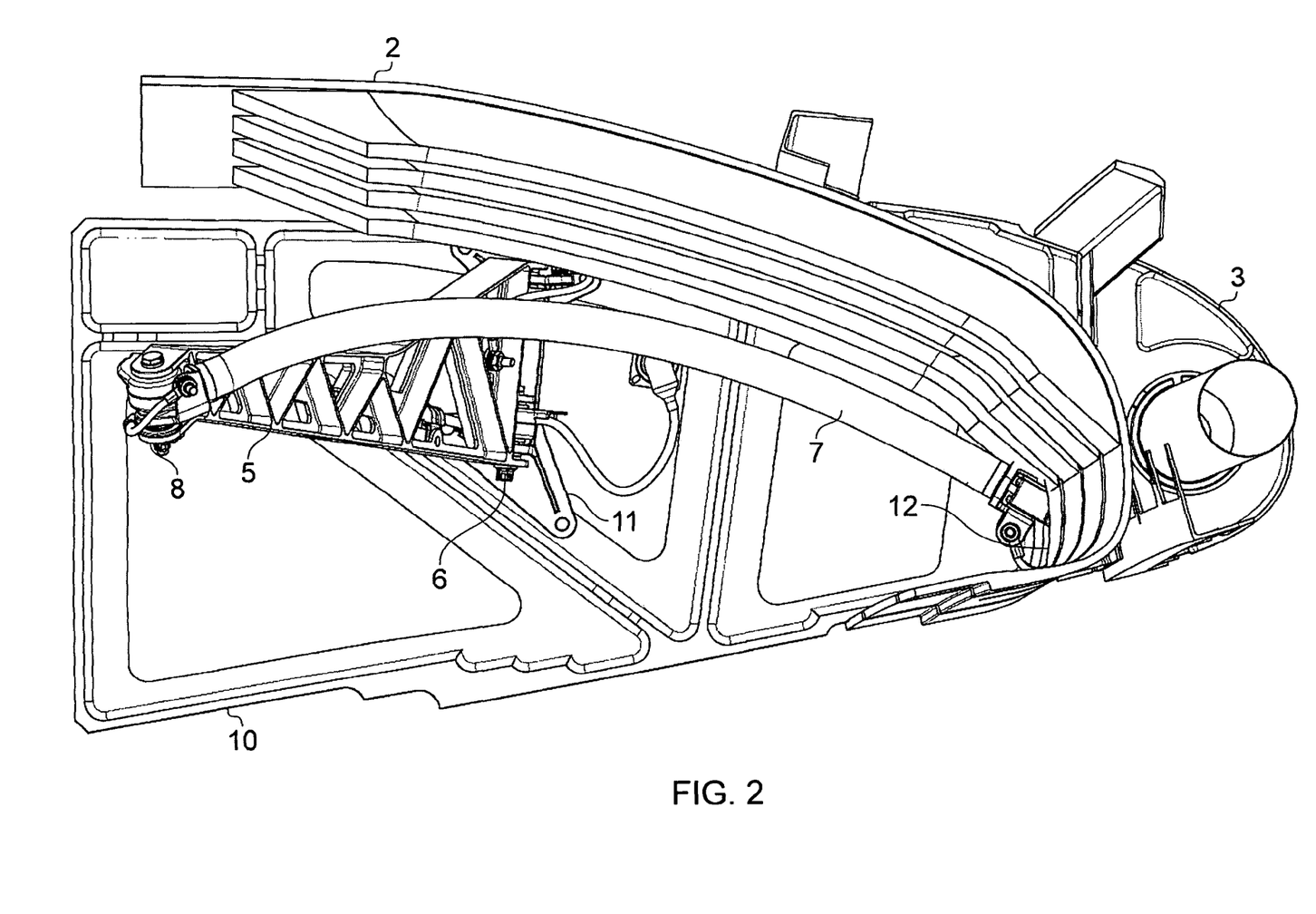
FIG. 2 is a sectional view through the leading edge of a wing.

FIGS. 2-9 are engineering drawings showing various parts of the system of FIG. 1 in detail. FIG. 2 is a sectional view through the leading edge of the wing and shows a leading edge rib 10 to which the proximal pivot joint 6 is attached by a bracket 11. The leading edge rib 10 is part of the fixed wing part and extends forwards from a leading-edge spar (not shown).

Figure 3:
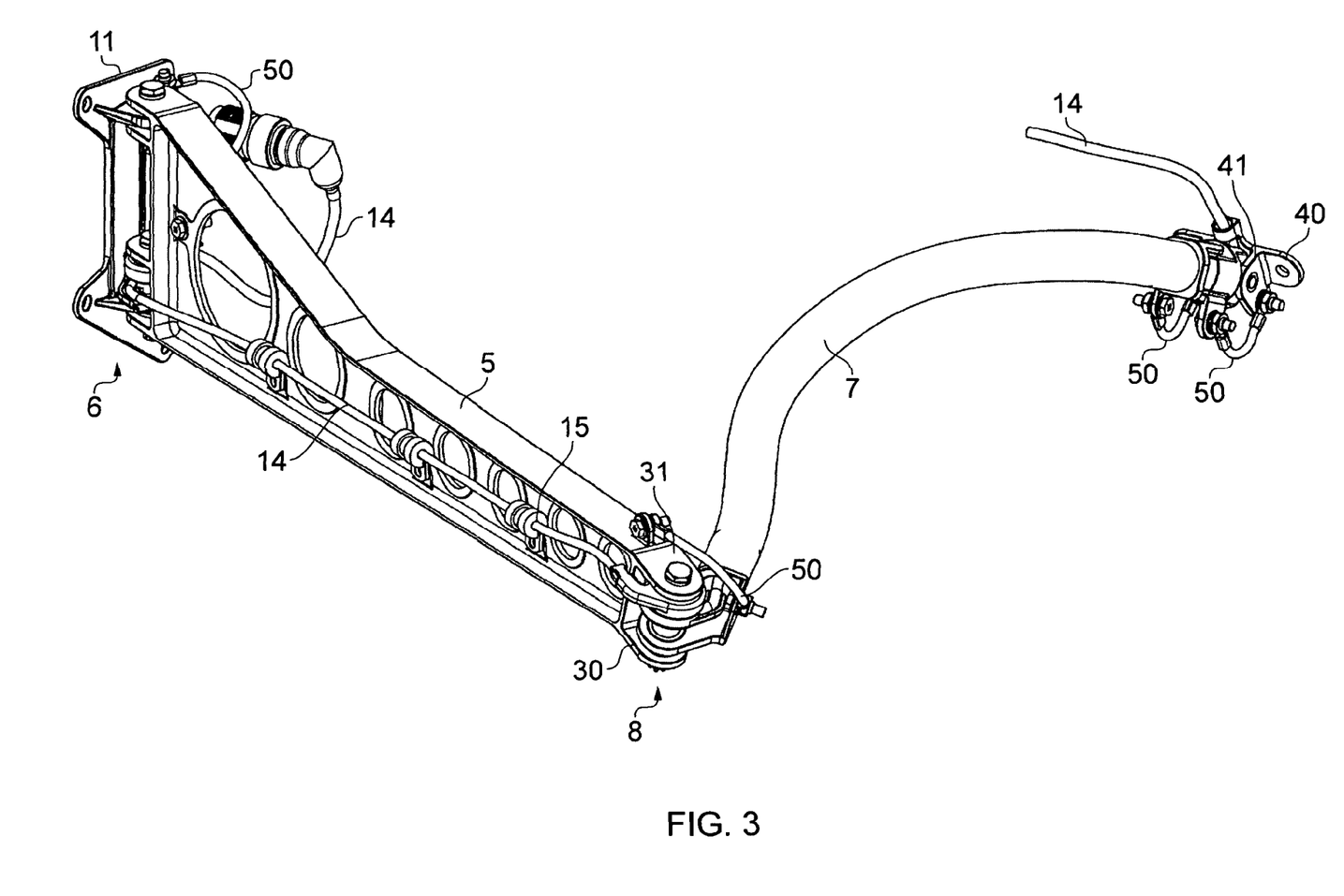
FIG. 3 is a perspective view of the linkage mechanism.
Figure 4:
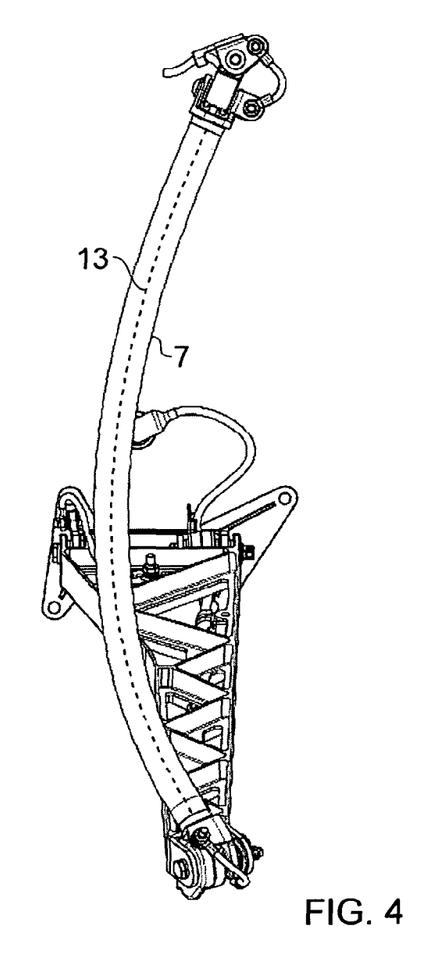
FIG. 4 is a front elevation view of the linkage mechanism.
Figure 5:
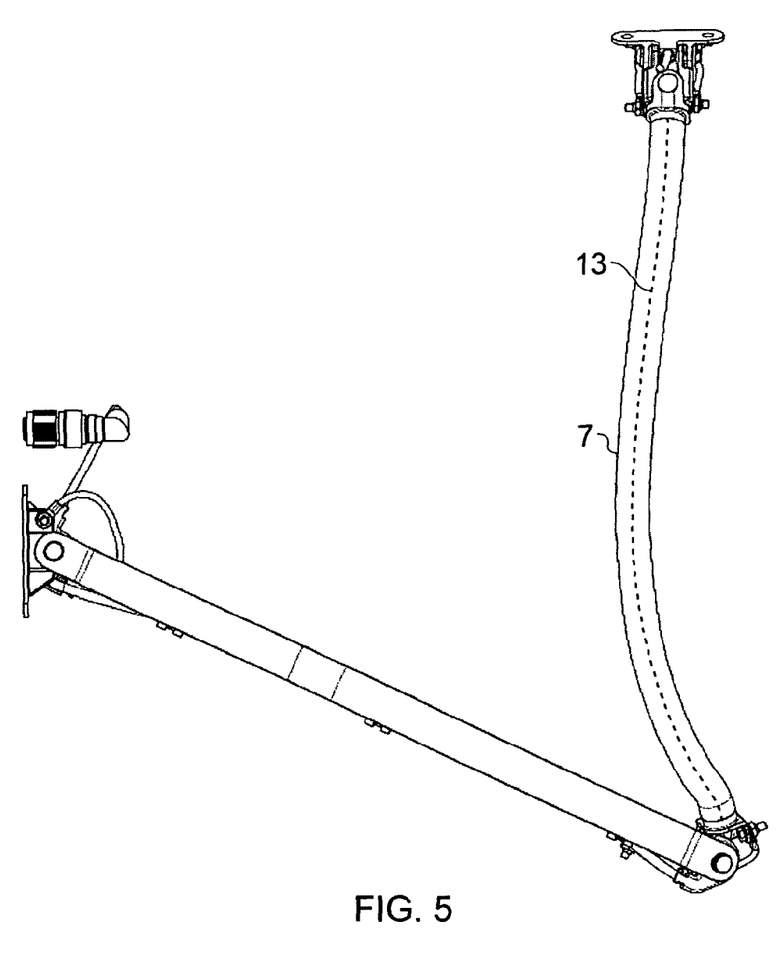
FIG. 5 is a plan view of the linkage mechanism.

FIG. 3 is a perspective view of the linkage system, FIG. 4 is a front elevation view and FIG. 5 is a plan view (orthogonal to FIG. 4). The centre line 13 of the distal arm 7 is shown in FIGS. 4 and 5. In order to pass through the skin of the leading edge at a single point, the centre line 13 is shaped as a three-dimensional curve: that is, it does not lie in a single plane and appears curved when viewed in all directions (e.g. FIGS. 4 and 5). Note also that the line 13 forms a smooth curve with little or no straight sections. Also, the line 13 is shaped as a three-dimensional curve along a majority of its length, in other words little or none of the curve forms a pure two-dimensional arc lying in a single plane.

The distal arm 7 is tubular and has an outer periphery which is substantially circular in cross-section. Thus the sides of the distal arm 7 also follow the same three-dimensional curve as the centre line 13. As can be seen in FIG. 2, the distal arm 7 of the linkage passes through an aperture 12 in the leading edge skin 2. The three-dimensional curve is designed so that at each position of movement of the slat the centre line 13 of the distal 7 arm passes through approximately the same point of the aperture 12. This enables the aperture in the skin 2 to be small, which provides a number of benefits, including:
- increasing the strength of the skin 2, which will make it more resistant to bird-strike impact
- minimising the ingress of foreign objects
- minimising the ingress of air, thus improving the aerodynamic performance of the wing.

Optionally the outer periphery of the distal arm 7 may form a seal with the skin 2, thereby substantially preventing the ingress of foreign objects and air. For instance the distal arm may engage a seal member (such as a brush) which is mounted in the aperture.

The movement of the linkage is statically deterministic: in other words for each position of the slat there is only a single position that the linkage can adopt. This deterministic movement is important to enable the linkage to be consistent and repeatable in its movement.

Returning to FIG. 3, the flexible cable 14 is attached to the proximal arm 5 by a series of P-clips 15 and threaded through the interior of the tubular distal arm 7. The cable 14 runs loose within the distal arm 7 without any P-clips. The interior of the distal arm 7 may be coated in a low friction material such as PTFE to prevent chafing of the cable 14. Bonding leads 50 connect the various parts of the linkage system to prevent the build-up of static electrical charge.

Figure 6:
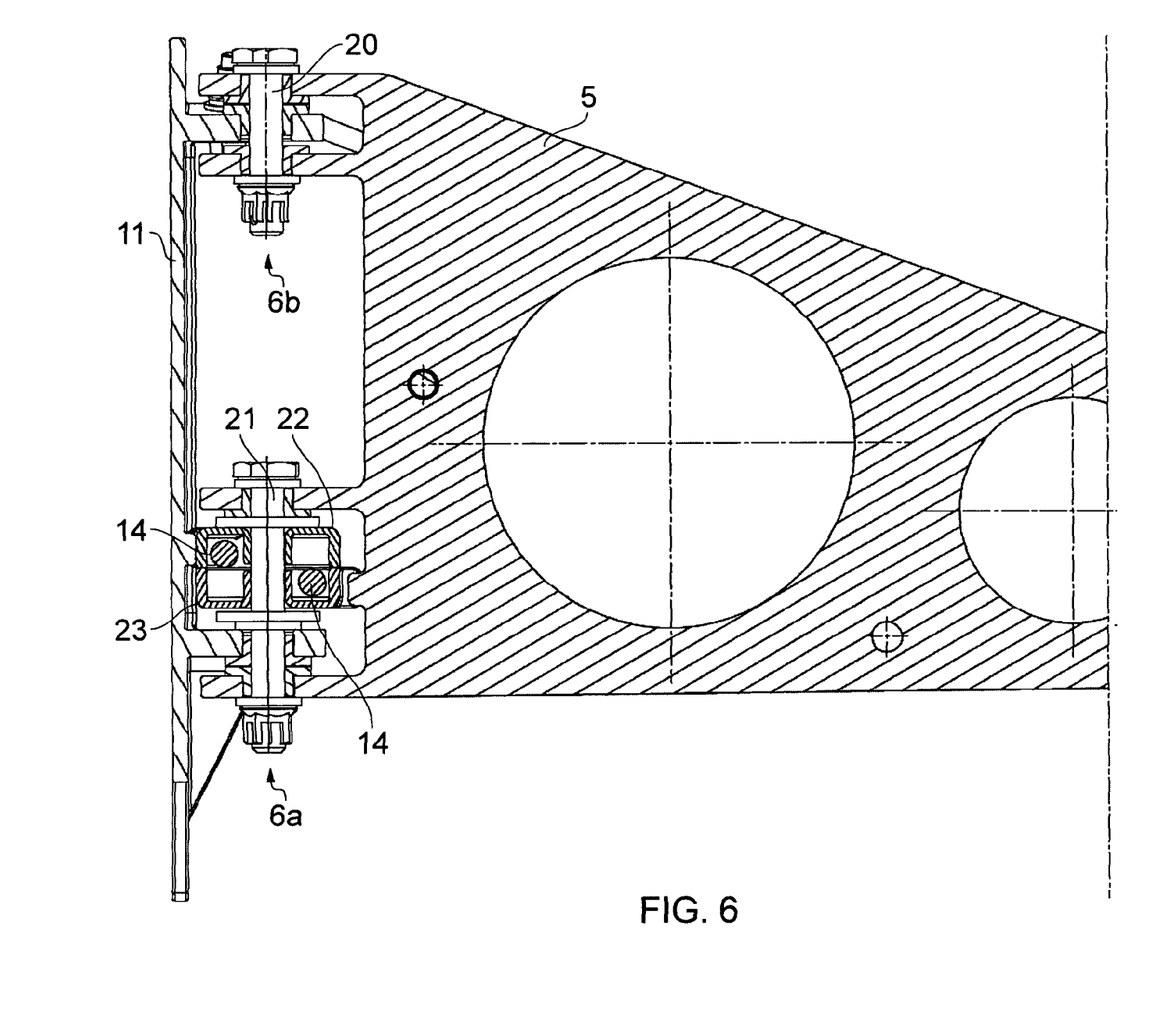
FIG. 6 is a sectional view of the proximal pivot joint.

FIG. 6 is a sectional view of the proximal pivot joint 6. The pivot joint 6 comprises a pair of clevis joints 6a, 6b with pivot pins 20, 21 which are co-axial and lie parallel with the bracket 11 and the spar (not shown). Thus the arm 5 can rotate on the clevis joints 6a, 6b about a single vertical pivot axis. The resulting purely horizontal motion of the arm 5 prevents it from interfering with hydraulic or electrical cables (or other system components) running in a spanwise sense along the wing.

The flexible cable 14 has a helical wound section shown in FIG. 6 with a winding axis coincident with the pivot axis. A cable protector disc 22,23 is provided at each end of the wound section along the pivot axis so as to constrain the adjacent end of the wound section. One of the cable protector discs is keyed with the bracket 11 so it remains stationary as the slat is deployed, and the other cable protector disc is keyed with the arm 5 so it rotates with the arm 5 as the slat is deployed. Further details of the cable protector discs can be found in WO2009130473, the disclosure of which is incorporated herein by reference.

Figure 7:
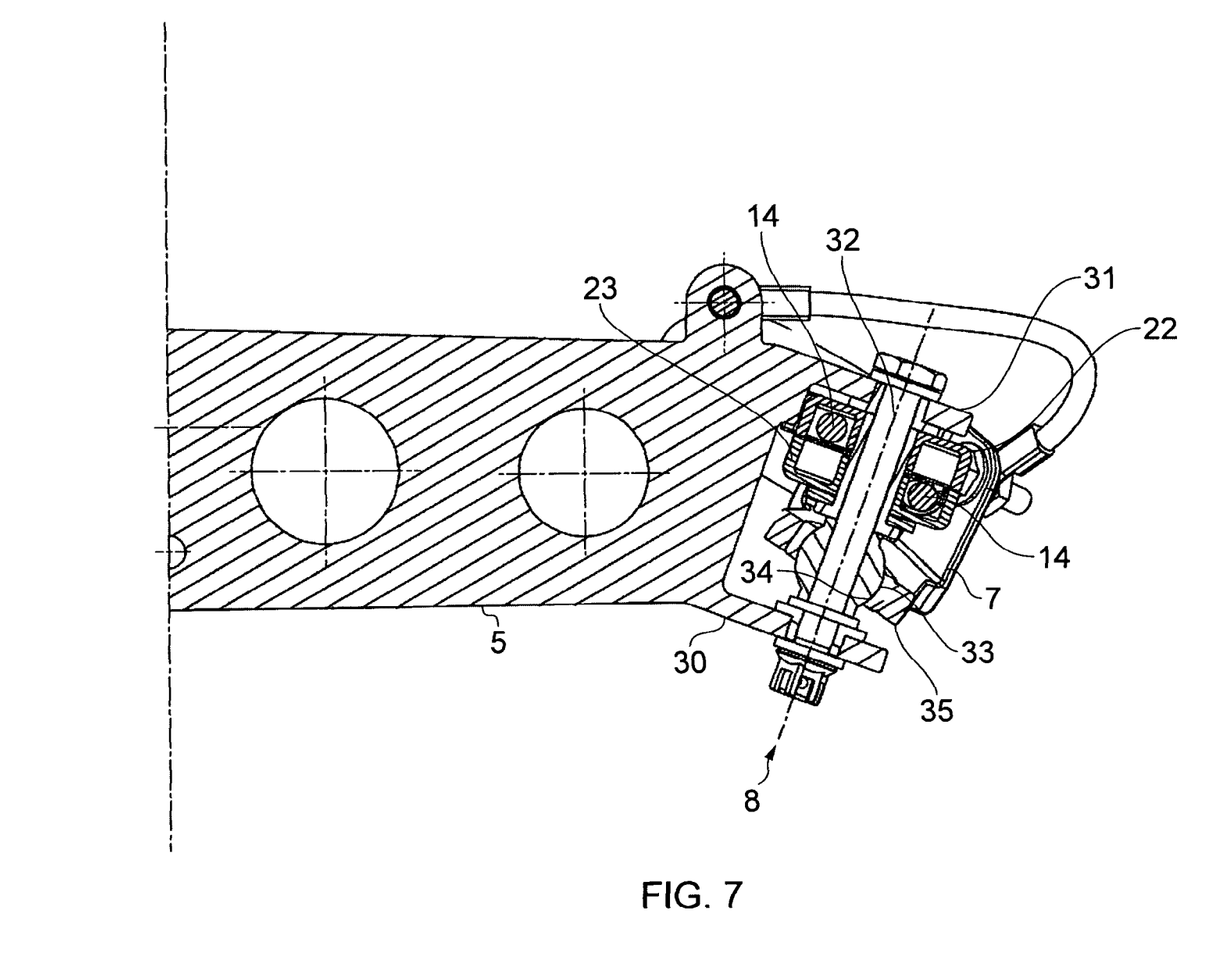
FIG. 7 is a sectional view of the intermediate ball joint.

FIG. 7 is a sectional view of the ball joint 8. The proximal arm 5 has a pair of lugs 30,31 which carry a pivot pin 32. The distal arm 7 has a lug 35 through which the pivot pin passes. The pivot pin has a ball with a spherical bearing surface 33 which engages a complimentary spherical bearing surface 34 of the aperture in the lug 35. Thus the ball joint 8 enables the distal arm 7 to rotate relative to the proximal arm 5 about three orthogonal axes including the axis of the pivot pin 32.

The flexible cable 14 has a helical wound section shown in FIG. 7 with a winding axis coincident with the pivot pin 32. A cable protector disc 22,23 is provided at each end of the wound section along the pivot axis so as to constrain the adjacent end of the wound section. One of the cable protector discs is keyed with the proximal arm 5, and the other cable protector disc is keyed with the distal arm 7 so it rotates with the arm 7 as the slat is deployed. Further details of the cable protector discs can be found in WO2009130473, the disclosure of which is incorporated herein by reference.

Figure 8:
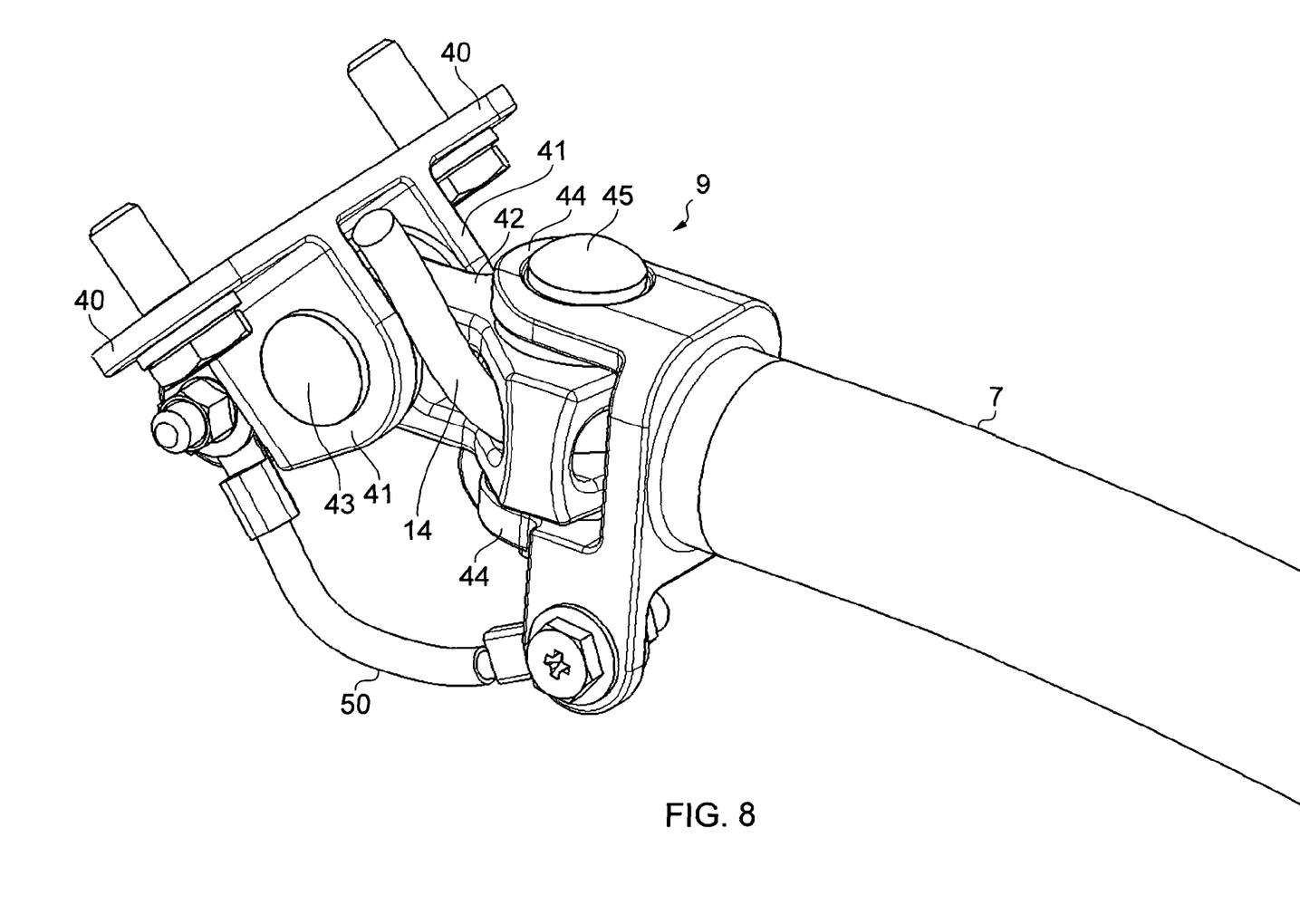
FIG. 8 is a perspective view of the distal pivot joint.
Figure 9:
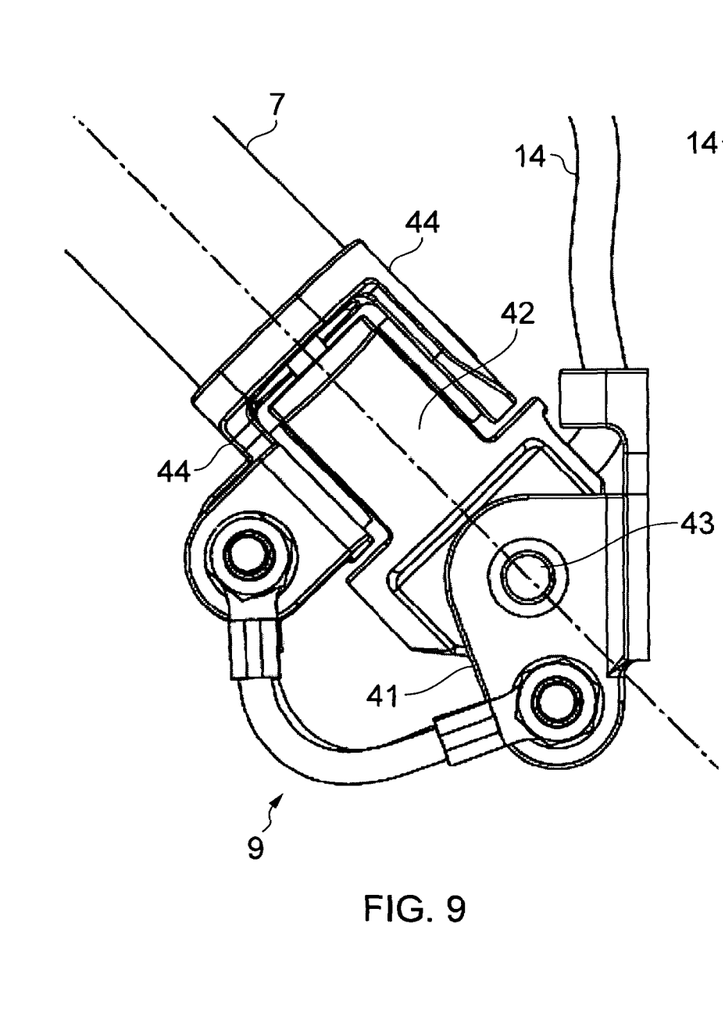
FIG. 9 is a side view of the distal pivot joint.
Figure 10:
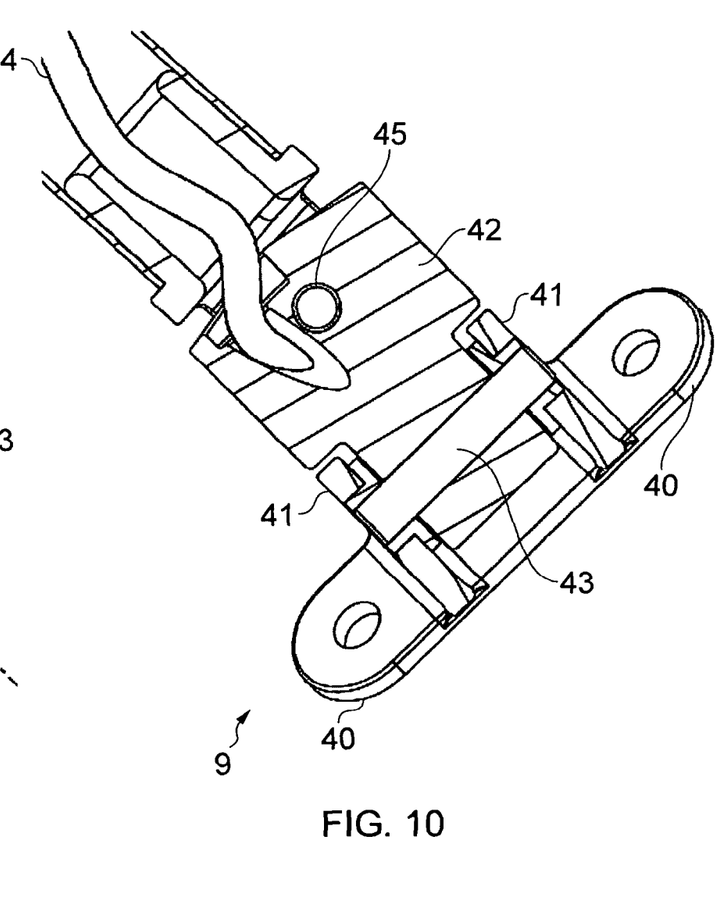
FIG. 10 is a sectional view of the distal pivot joint.

FIGS. 8-10 show the distal pivot joint 9 in detail. The joint comprises a bracket with a pair of wings 40 which are bolted to the slat, and a pair of lugs 41. A distal end of a connector 42 is positioned between the lugs 41 and forms a clevis joint with a pivot pin 43. The distal arm 7 has a pair of lugs 44. A proximal end of the connector 42 is positioned between the lugs 44 and forms a clevis joint with a pivot pin 45 at right angles to the pivot pin 43. Thus the distal pivot joint 9 permits the distal arm 7 to rotate relative to the slat about only two orthogonal axes of rotation (that is, the axes of the pivot pins 43 and 45).

The cable 14 passes out of the distal arm 7 and through a hole in the connector 42.

Figure 11:
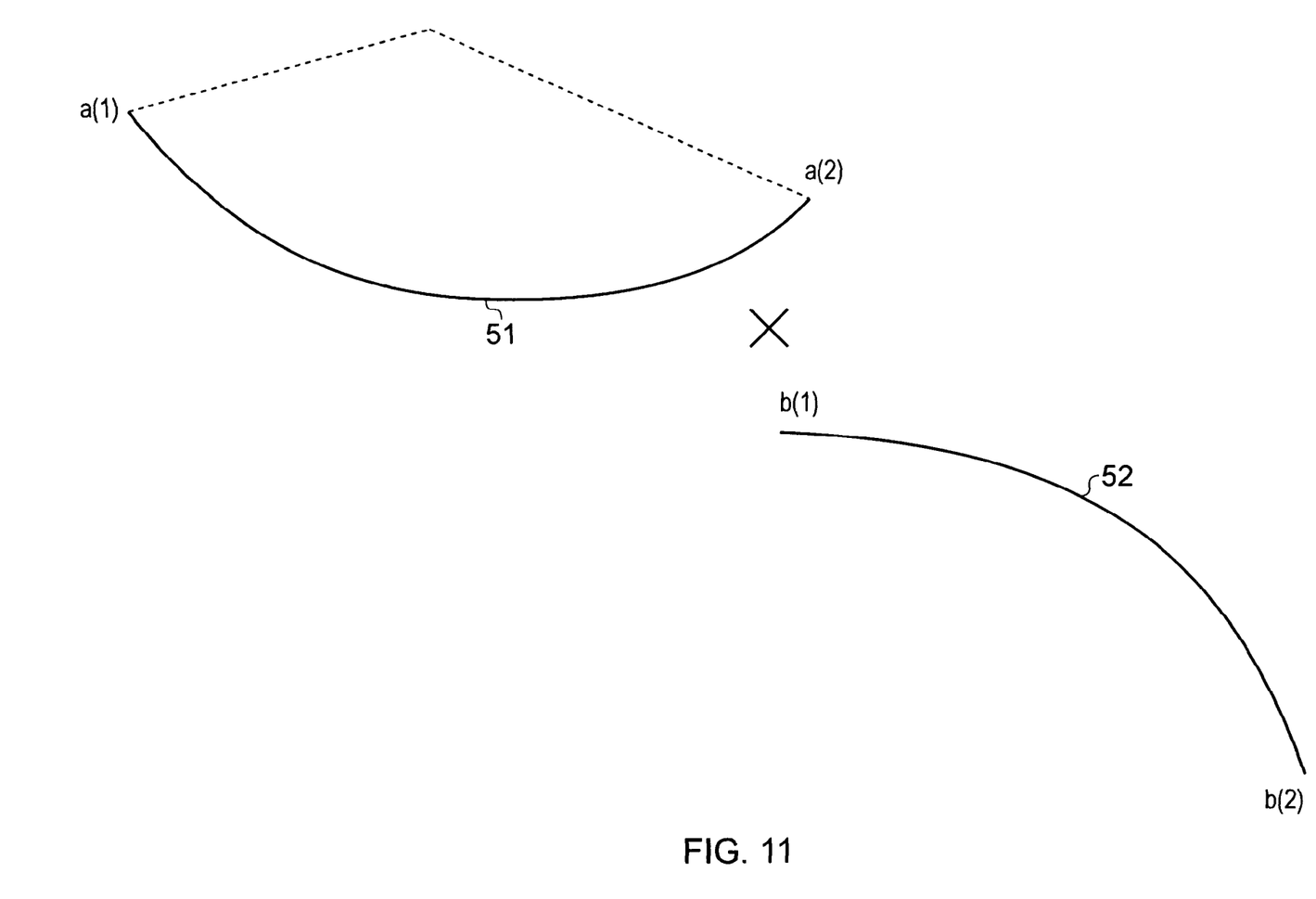
FIG. 11 is a schematic drawing showing how the three-dimensional curve of the centre-line of the distal arm is calculated.

The three-dimensional curve of the centre-line 13 of the distal arm 7 is designed and manufactured by a process described below and illustrated schematically in FIG. 11.

1. An arc of movement 51 of the centre of the ball-joint 8 at the end of the proximal arm is plotted as a first curve with end points a(1) and a(2). Since the proximal arm 5 is mounted on a single-axis pivot joint 6, this arc of movement 51 is a two-dimensional curve with a constant curvature.
2. An arc of movement 52 of the distal end of the arm 7 is plotted as a second series curve with end points b(1) and b(2). This curve may be a two or three-dimensional curve but must have the same length as the curve 51.
3. At each point of movement, the ends of the distal arm 7 must be at points a(1), b(1) etc., and the centre line 13 must also pass through (or close to) a point X at the centre of the aperture in the skin. This enables the shape of the three-dimensional centre line 13 to be calculated.
4. The distal arm 7 is manufactured with a centre line 13 which is shaped to form the three-dimensional curve. The tube may be formed by deforming an initially straight tube in a press, or by passing an initially straight tube through a 3D CNC pipe bending machine which bends the tube as it is passed through the machine.

Figure 12:
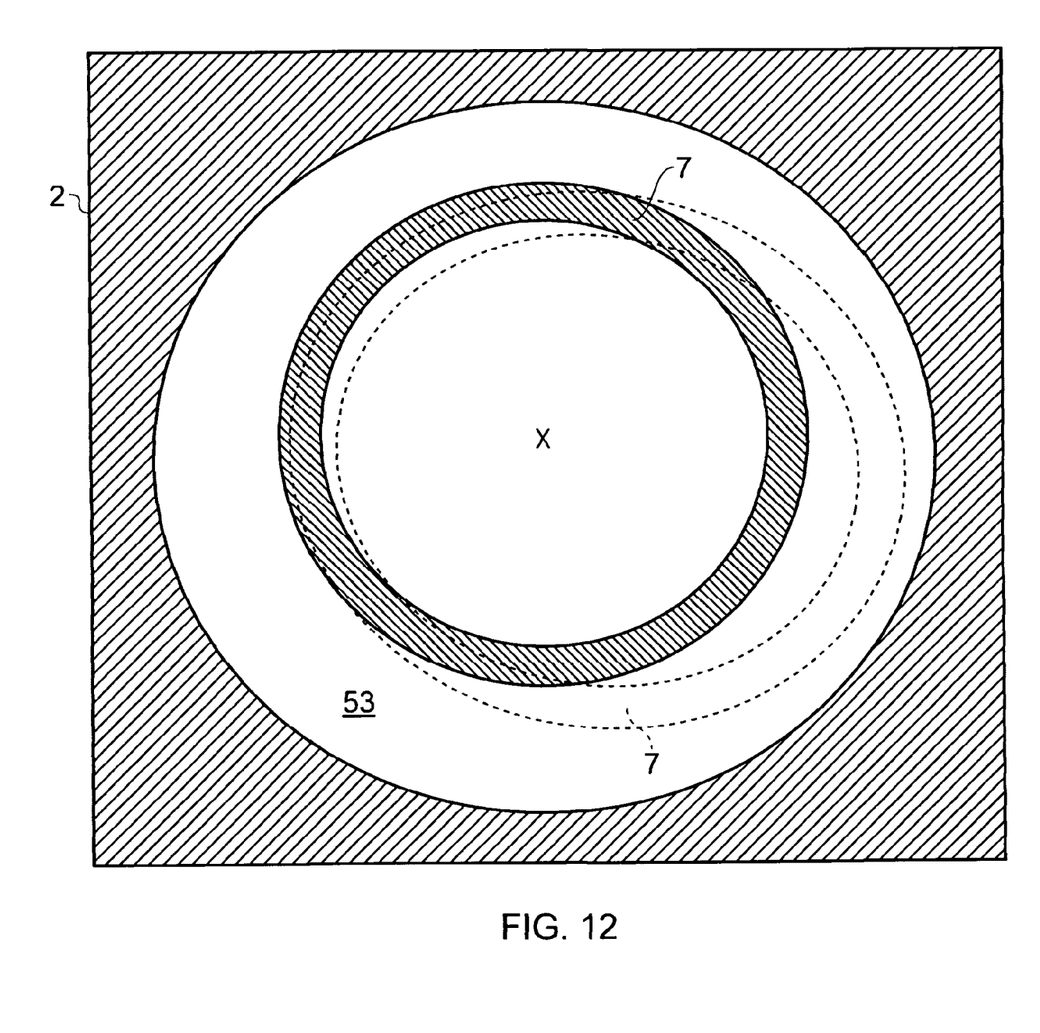
FIG. 12 is a schematic cross-sectional view through the skin and distal arm.

FIG. 12 is a cross-sectional view through the leading edge skin 2 at the point where the distal arm passes through it. The skin 2 has an aperture 53 through which the arm 7 passes. Note that FIG. 12 is highly schematic. For instance the cable passing through the distal arm is not shown for purposes of clarity. Also the shape of the aperture 53 is shown as a symmetrical shape when in fact it may have a more complex shape.

At the start of its movement the distal arm 7 cross-section is shown in solid lines and is centred on the central point X of the aperture. As the slat deploys there will be a small amount of relative movement between the distal arm cross-section and the aperture. For instance the distal arm 7 is shown at another position in its movement in dashed lines. In this position the cross-section has become oval (since the arm 7 is not passing through the skin at right angles). Also it has moved slightly towards the edge of the aperture. However, the degree of movement is relatively small so that at each position of movement of the slat a part of the distal arm cross-section coincides with the central point X of the aperture 53.

The use of a three-axis ball joint (instead of a series of three single axis joints) is preferred because it enables a relatively small amount of movement between the centre line 13 and the central point X of the aperture.

Although the invention has been described above with reference to one or more preferred embodiments, it will be appreciated that various changes or modifications may be made without departing from the scope of the invention as defined in the appended claims.

The invention claimed is:

1. A linkage for guiding and protecting a flexible cable between first and second structures, the second structure being movable relative to the first structure, the linkage comprising:
   a proximal arm;
   a proximal pivot joint for coupling the proximal arm to the first structure; and
   a distal arm which is coupled to the proximal arm by one or more intermediate pivot joints, wherein the distal arm is shaped as a three-dimensional curve along a majority of its length;
   wherein the three-dimensional curve extends beyond a single plane and appears curved when viewed in all directions.

2. The linkage of claim 1 wherein the intermediate pivot joint(s) permit the distal arm to rotate relative to the proximal arm about two or more axes of rotation.

3. The linkage of claim 2 wherein the distal arm is coupled to the proximal arm by a ball joint.

4. The linkage of claim 3 wherein the ball joint permits the distal arm to rotate relative to the proximal arm about three axes of rotation.

5. The linkage of claim 1 further comprising a distal pivot joint for coupling the distal arm to the second structure.

6. The linkage of claim 5, wherein the distal pivot joint permits the distal arm to rotate relative to the second structure about at least two axes of rotation.

7. The linkage of claim 6 wherein the distal pivot joint comprises a pair of single-axis joints which are connected together by a connector.

8. The linkage of claim 1 wherein the distal arm is tubular.

9. The linkage of claim 1 wherein the distal arm has a center line which is shaped as a three-dimensional curve along a majority of its length.

10. The linkage of claim 1 further comprising a helical channel for guiding the flexible cable in one or more coils.

11. The linkage of claim 10 wherein an axis of the helical channel is substantially coaxial with the pivot joint which couples the proximal arm to the distal arm.

12. An aircraft wing comprising:
a fixed wing having a skin;
a control surface movable relative to the fixed wing between a retracted position and an extended position;
a flexible cable extending between the fixed wing and the control surface; and
a linkage guiding and protecting the flexible cable and movable between a retracted position when the control surface is in a retracted position and an extended position when the control surface is in an extended position, wherein the linkage comprises a proximal arm which is coupled to the fixed wing by a proximal pivot joint; and a distal arm which is coupled to the proximal arm by one or more intermediate pivot joints and to the control surface by a distal pivot joint,
wherein the distal arm of the linkage passes through an aperture in the skin of the fixed wing and is shaped as a three-dimensional curve along a majority of a length of the distal arm.

13. The aircraft wing of claim 12 wherein the distal arm engages the skin of the fixed wing as the distal arm passes through the aperture.

14. The aircraft wing of claim 12 wherein the control surface is a leading edge slat.

15. A method of deploying the control surface of the aircraft wing of claim 12, the method comprising:
moving the control surface relative to the fixed wing between a retracted position and an extended position; and
moving the linkage between a retracted position when the control surface is in the retracted position and an extended position when the control surface is in the extended position,
wherein at each position of movement of the control surface a part of the distal arm cross-section passes through a same point of the aperture.

* * * * *